United States Patent
Nakamura et al.

(10) Patent No.: US 6,470,761 B1
(45) Date of Patent: Oct. 29, 2002

(54) CONNECTING LINK BETWEEN THE ROTOR AND THE CAM PLATE OF A VARIABLE DISPLACEMENT SWASH PLATE COMPRESSOR

(75) Inventors: Shinji Nakamura; Shinji Tagami, both of Isesaki (JP)

(73) Assignee: Sanden Corporation, Gunma (JP)

( * ) Notice: Subject to any disclaimer, the term of this patent is extended or adjusted under 35 U.S.C. 154(b) by 9 days.

(21) Appl. No.: 09/706,769

(22) Filed: Nov. 7, 2000

(30) Foreign Application Priority Data

Nov. 9, 1999 (JP) .......................................... 11-317982

(51) Int. Cl.[7] ............................. F16H 23/02; F01B 1/29
(52) U.S. Cl. ......................................... 74/60; 417/222.1
(58) Field of Search ............................ 74/60; 417/222.1

(56) References Cited

U.S. PATENT DOCUMENTS

| | | |
|---|---|---|
| 4,632,640 A | 12/1986 | Terauchi |
| 4,880,360 A | 11/1989 | Terauchi et al. |
| 5,137,431 A | 8/1992 | Kiyoshi et al. |
| 5,425,303 A * | 6/1995 | Shimizu et al. .............. 417/269 |
| 6,139,283 A * | 10/2000 | Ahn ......................... 417/222.2 |
| 6,158,968 A * | 12/2000 | Nakamura ................ 417/222.1 |

* cited by examiner

Primary Examiner—William C. Joyce
(74) Attorney, Agent, or Firm—Baker Botts L.L.P.

(57) ABSTRACT

A connecting link between a rotor supported by a driving shaft to rotate synchronously with the driving shaft and a variable inclination cam plate supported by the driving shaft of a variable displacement swash plate compressor comprises a first arm extending from the rotor toward the cam plate and a second arm extending from the cam plate toward the rotor. The first arm is provided with an oval guide hole extending at right angles to a plane defined by the central axis of the driving shaft and the top dead center of the cam plate. The second arm is provided with a pin extending at right angles to the plane. The pin has a sector-shaped cross section with rounded apex. The pin is inserted in the oval guide hole with the apex of the sector-shaped cross section abutted against the long side surface of the oval guide hole distant from the rotor and the circular arc portion of the sector-shaped cross section abutted against the long side surface of the oval guide hole close to the rotor.

8 Claims, 8 Drawing Sheets

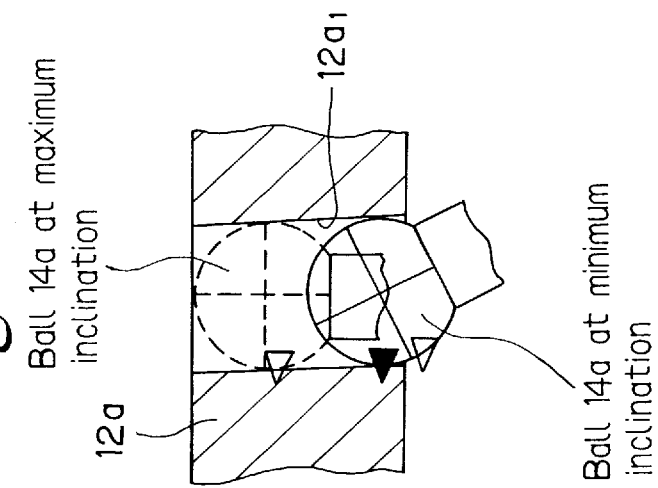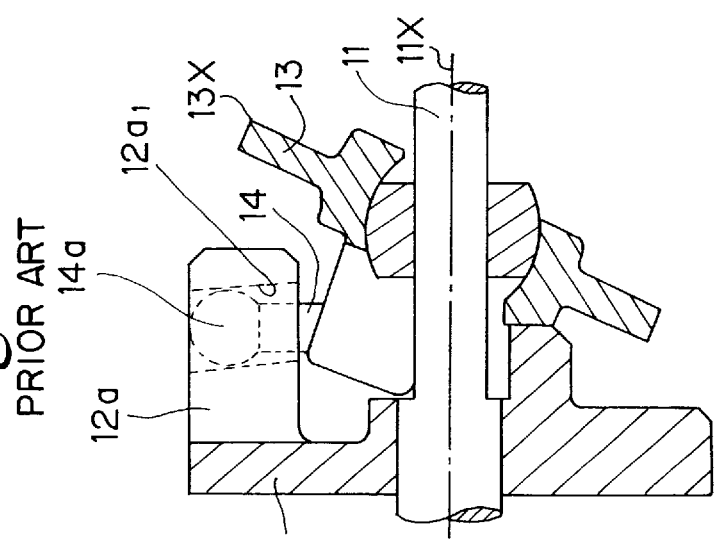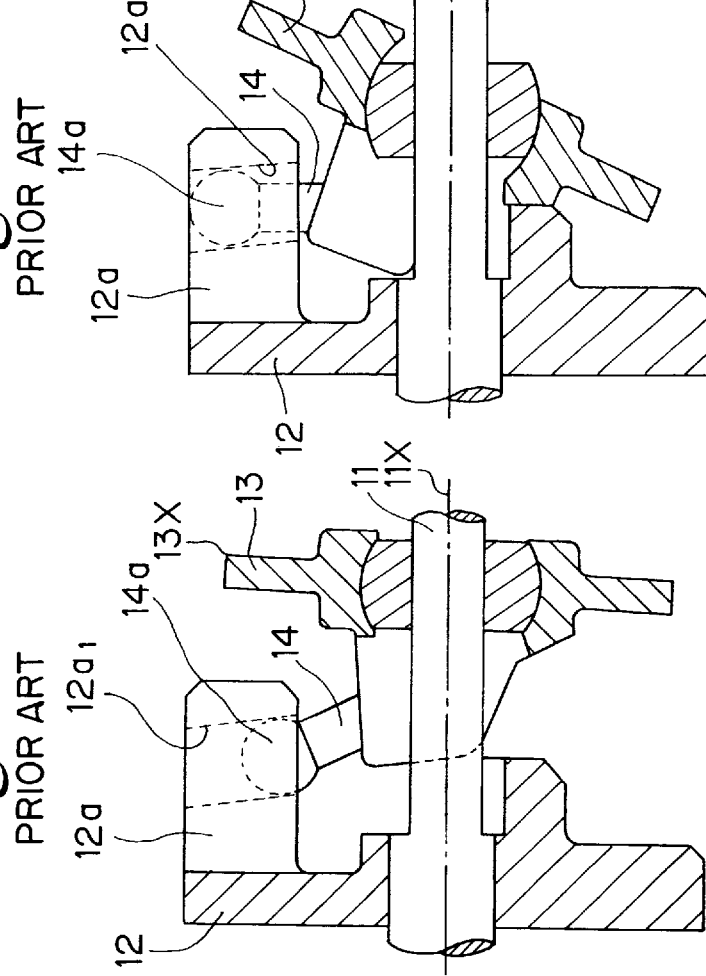

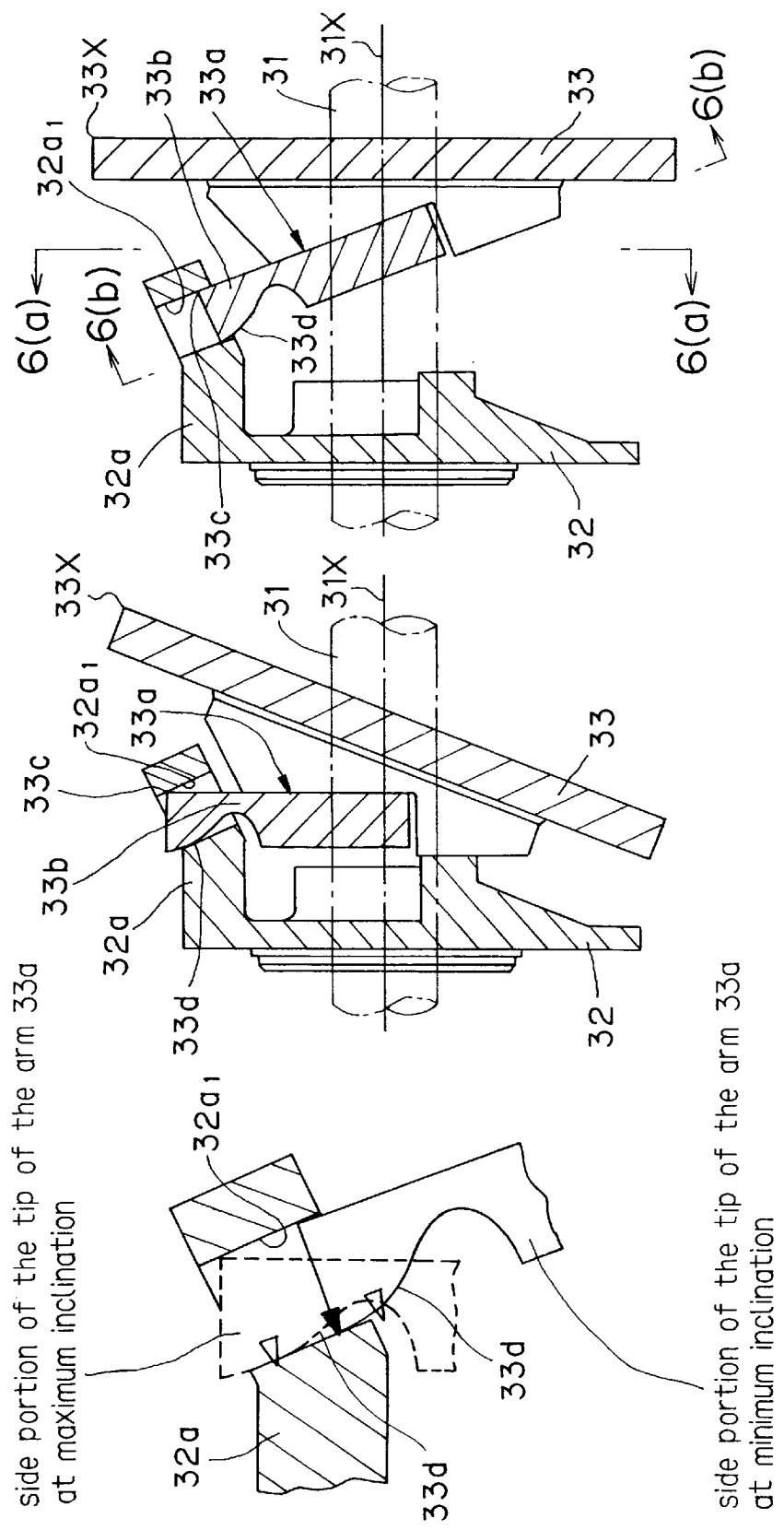

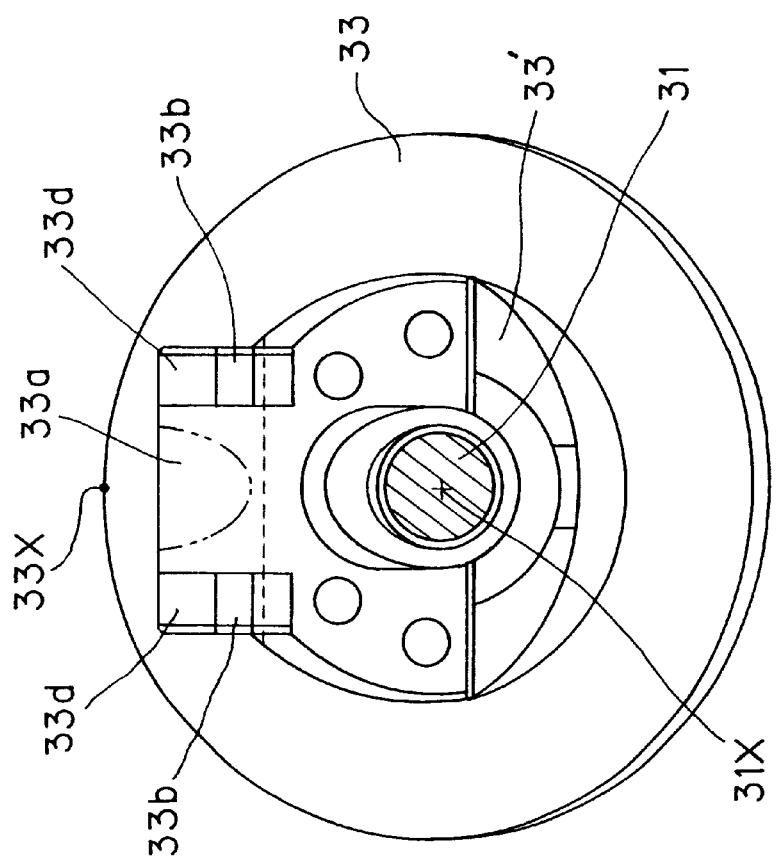
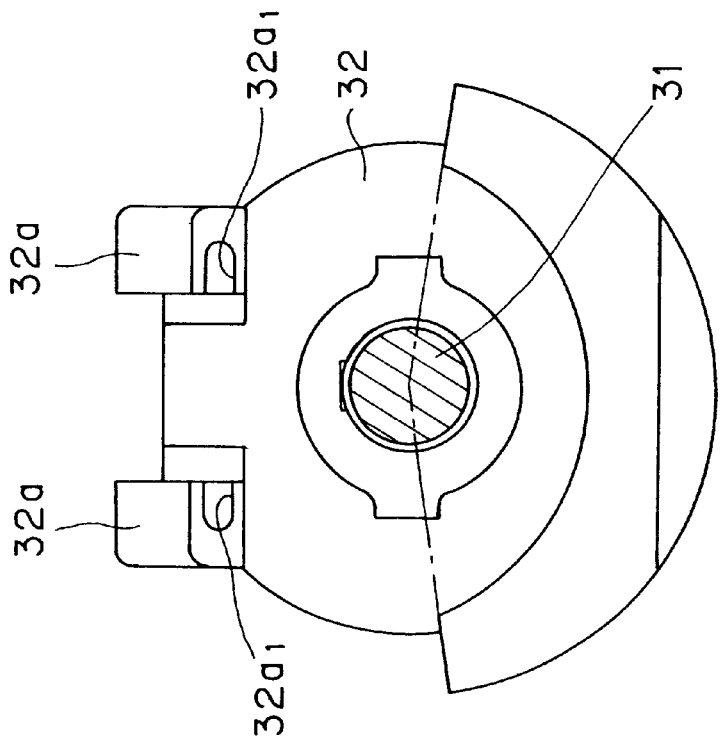

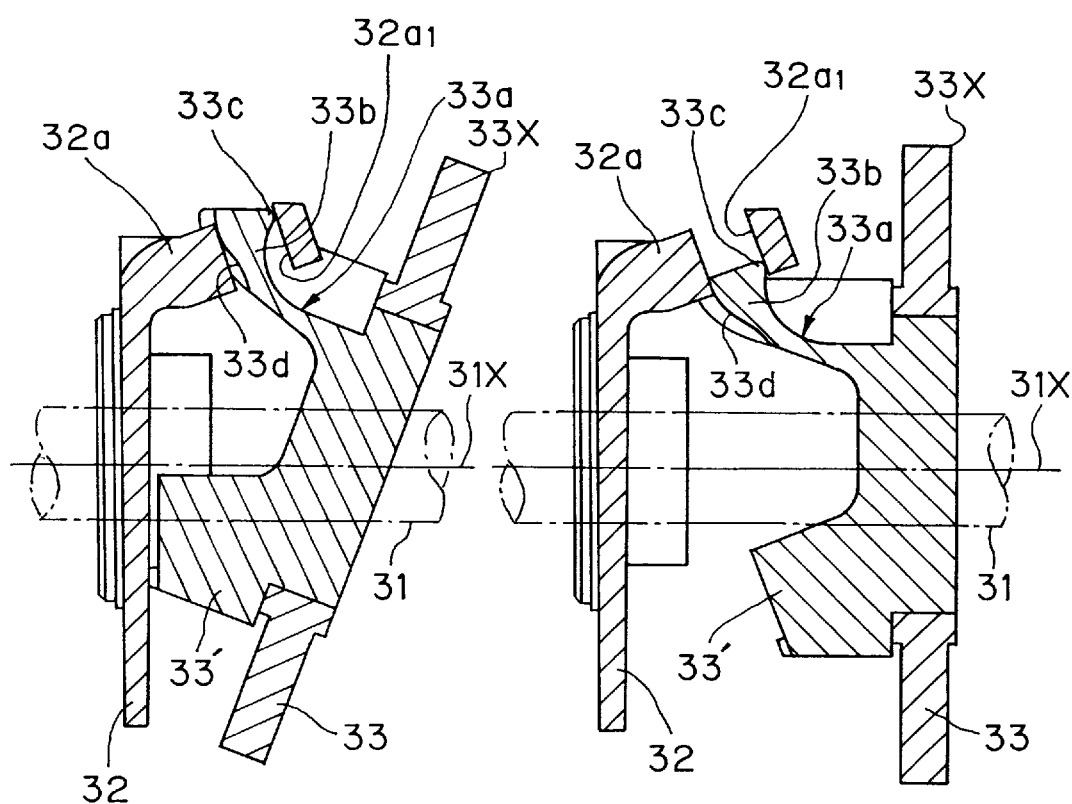

CONNECTING LINK BETWEEN THE ROTOR AND THE CAM PLATE OF A VARIABLE DISPLACEMENT SWASH PLATE COMPRESSOR

BACKGROUND OF THE INVENTION

The present invention relates to a connecting link between the rotor and the cam plate of a variable displacement swash plate compressor.

As shown in FIG. 1, there is known a connecting link between a rotor 2 supported by a driving shaft 1 to rotate synchronously with the driving shaft 1 and a variable inclination cam plate 3 supported by the driving shaft 1 of a variable displacement swash plate compressor. The cam plate 3 can incline between the minimum inclination shown in FIG. 1(a) and the maximum inclination shown in FIG. 1(b). The connecting link comprises a first arm 2a extending from the rotor 2 toward the cam plate 3 and a second arm 3a extending from the cam plate 3 toward the rotor 2. The first arm 2a is provided with an oval guide hole 2a, extending at right angles to a plane defined by the central axis 1X of the driving shaft 1 and the top dead center 3X of the cam plate 3. The second arm 3a is provided with a pin 4 extending at right angles to the plane. The pin 4 has a circular cross section and is inserted in the oval guide hole $2a_7$ with its circumferential side surface abutted against both the long side surface of the oval guide hole $2a_7$ distant from the rotor 2 and the long side surface of the oval guide hole $2a_7$ close to the rotor 2.

In FIG. 1(c), the abutting point of the surface of the pin 4 against the long side surface of the oval guide hole $2a_7$ at the minimum inclination of the cam plate 3 is indicated by a solid triangle, while the abutting point of the surface of the pin 4 against the long side surface of the oval guide hole $2a_7$ at the maximum inclination of the cam plate 3 is indicated by an open triangle. As seen from FIG. 1(c), the abutting point indicated by the solid triangle is close to the abutting point indicated by the open triangle. Therefore, a quite narrow region of the surface of the pin 4 abuts repeatedly against the long side surface of the oval guide hole $2a_7$ following the fluctuation of the inclination of the cam plate 3.

High contact pressure is generated at the abutting point between the surface of the pin 4 and the long side surface of the oval guide hole $2a_7$ close to the rotor 2 because a thrust force is transmitted from the cam plate 3 to rotor 2 during the operation of the compressor. Therefore, if the quite narrow region of the surface of the pin 4 abuts repeatedly against the long side surface of the oval guide hole $2a_7$ close to the rotor 2 following the fluctuation of the inclination of the cam plate 3, the surface of the pin 4 in the narrow region is rapidly worn away, the pin 4 rapidly wears out, and the connecting link rapidly wears out.

As shown in FIG. 2, there is known a connecting link between a rotor 12 supported by a driving shaft 11 to rotate synchronously with the driving shaft 11 and a variable inclination cam plate 13 supported by the driving shaft 11 of a variable displacement swash plate compressor.

The cam plate 13 can incline between the minimum inclination shown in FIG. 2(a) and the maximum inclination shown in FIG. 2(b). The connecting link comprises a first arm 12a extending from the rotor 12 toward the cam plate 13 and a pin 14 extending from the cam plate 13 toward the rotor 12. The first arm 12a is provided with a guide hole $12a_7$ extending parallel to a plane defined by the central axis 11X of the driving shaft 11 and the top dead center 13X of the cam plate 13. The pin 14 is provided with a ball 14a at its tip. The pin 14 is inserted in the guide hole $12a_7$ with the ball 14a abutted against the side surface of the guide hole $12a_7$.

In FIG. 2(c), the abutting point of the surface of the ball 14a against the side surface of the guide hole $12a_7$ at the minimum inclination of the cam plate 13 is indicated by a solid triangle, while the abutting point of the surface of the ball 14a against the side surface of the guide hole $12a_7$ at the maximum inclination of the cam plate 13 is indicated by an open triangle. As seen from FIG. 2(c), the abutting point indicated by the solid triangle is close to the abutting point indicated by the open triangle.

Therefore, a quite narrow region of the surface of the ball 14a abuts repeatedly against the side surface of the guide hole $12a_7$ following the fluctuation of the inclination of the cam plate 13.

High contact pressure is generated at the abutting point between the surface of the ball 14a and the side surface of the guide hole $12a_7$ close to the rotor 12 because a thrust force is transmitted from the cam plate 13 to rotor 12 during the operation of the compressor. Therefore, if the quite narrow region of the surface of the ball 14a abuts repeatedly against the side surface of the guide hole $12a_7$ close to the rotor 12 following the fluctuation of the inclination of the cam plate 13, the surface of the ball 14a in the narrow region is rapidly worn away, the ball 14a rapidly wears out, and the connecting link rapidly wears out.

SUMMARY OF THE INVENTION

An object of the present invention is to provide a connecting link between the rotor and the cam plate of a variable displacement swash plate compressor superior in durability to the conventional connecting link.

In accordance with one aspect of the present invention, there is provided a connecting link between a rotor supported by a driving shaft to rotate synchronously with the driving shaft and a variable inclination cam plate supported by the driving shaft of a variable displacement swash plate compressor, comprising a first arm extending from the rotor toward the cam plate and a second arm extending from the cam plate toward the rotor, wherein the first arm is provided with an oval guide hole extending at right angles to a plane defined by the central axis of the driving shaft and the top dead center of the cam plate, the second arm is provided with a pin extending at right angles to the plane, the pin has a sector-shaped cross section with rounded apex, and the pin is inserted in the oval guide hole with the apex of the sector-shaped cross section abutted against the long side surface of the oval guide hole distant from the rotor and the circular arc portion of the sector-shaped cross section abutted against the long side surface of the oval guide hole close to the rotor In the connecting link of this aspect of the present invention, the cross section of the pin inserted into the oval guide hole of the rotor is sector-shaped. Therefore, the radius of curvature of the circular arc portion of the sector-shaped cross section of the pin inserted into the oval guide hole (with the circular arc portion abutted against the long side surface of the oval guide hole close to the rotor) can be made larger than that of the circular cross section of the pin of the conventional connecting link shown in FIG. 1.

In the connecting link of this aspect of the present invention, the radius of curvature of the circular arc portion of the sector-shaped cross section of the pin is larger than that of the circular cross section of the pin of the conventional connecting link shown in FIG. 1. Therefore, the distance between the abutting point of the surface of the pin against the long side surface of the oval guide hole close to the rotor at the minimum inclination of the cam plate and the abutting point of the surface of the pin against the long side surface of the oval guide hole close to the rotor at the maximum inclination of the cam plate is larger than that of the conventional connecting link shown in FIG. 1. Thus, the region of the surface of the pin abutting repeatedly against the long side surface of the oval guide hole close to the rotor following the fluctuation of the inclination of the cam plate is larger than that of the conventional connecting link.

High contact pressure is generated at the abutting point between the surface of the pin and the long side surface of the oval guide hole close to the rotor because a thrust force is transmitted from the cam plate to rotor during the operation of the compressor. However, the wear of the surface of the pin of the present connecting link is less than that of the conventional connecting link shown in FIG. 1, the durability of the pin of the present connecting link is greater than that of the conventional connecting link shown in FIG. 1, and the durability of the present connecting link is greater than that of the conventional connecting link shown in FIG. 1, because the region of the surface of the pin of the present connecting link abutting repeatedly against the long side surface of the oval guide hole close to the rotor following the fluctuation of the inclination of the cam plate is larger than that of the conventional connecting link.

The apex of the sector-shaped cross section of the pin of the present connecting link abuts against the long side surface of the oval guide hole distant from the rotor. However, no high contact pressure is generated at the abutting point between the apex of the sector-shaped cross section of the pin and the long side surface of the oval guide hole distant from the rotor because the apex of the sector-shaped cross section of the pin is forced in the direction apart from the long side surface of the oval guide hole distant from the rotor. Moreover, the apex of the sector-shaped cross section of the pin is rounded. Therefore, no excessive wear is generated on the apex of the sector-shaped cross section of the pin.

In accordance with another aspect of the present invention, there is provided a connecting link between a rotor supported by a driving shaft to rotate synchronously with the driving shaft and a variable inclination cam plate supported by the driving shaft of a variable displacement swash plate compressor, comprising a first arm extending from the rotor toward the cam plate and a second arm extending from the cam plate toward the rotor, wherein the first arm is provided with a guide groove extending parallel to a plane defined by the central axis of the driving shaft and the top dead center of the cam plate, the second arm is provided with a tip whose shape as viewed from the side is a sector with rounded apex, and the tip of the second arm is inserted in the guide groove with the apex of the sector abutted against the side surface of the guide groove distant from the rotor and the circular arc portion of the sector abutted against the side surface of the guide groove close to the rotor.

In the connecting link of this aspect of the present invention, the second arm is provided with a tip of sector shape in side view. Therefore, the radius of curvature of the circular arc portion of the sector of the tip inserted into the guide groove (with the circular arc portion abutted against the side surface of the guide groove close to the rotor) can be made larger than that of the ball at the tip of the pin of the conventional connecting link shown in FIG. 2.

In the connecting link of this aspect of the present invention, the radius of curvature of the circular arc portion of the sector of the tip of the second arm is larger than that of the ball at the tip of the pin of the conventional connecting link. Therefore, the distance between the abutting point of the surface of the circular arc portion of the sector of the tip of the second arm against the side surface of the guide grove at the minimum inclination of the cam plate and the abutting point of the surface of the circular arc portion of the sector of the tip of the second arm against the side surface of the guide groove at the maximum inclination of the cam plate is larger than the distance between the abutting points of the surface of the ball at the tip of the second arm of the conventional connecting link shown in FIG. 2. Thus, the region of the surface of the circular arc portion of the sector of the tip of the second arm abutting repeatedly against the side surface of the guide groove following the fluctuation of the inclination of the cam plate is larger than the repeatedly abutting region of the surface of the ball at the tip of the second arm of the conventional connecting link shown in FIG. 2.

High contact pressure is generated at the abutting point between the surface of the circular arc portion of the sector of the tip of the second arm and the side surface of the guide groove close to the rotor because a thrust force is transmitted from the cam plate to rotor during the operation of the compressor. However, the wear of the surface of the circular arc portion of the sector of the tip of the second arm of the present connecting link is less than the wear of the surface of the ball at the tip of the second arm of the conventional connecting link shown in FIG. 2, the durability of the second arm of the present connecting link is greater than that of the conventional connecting link shown in FIG. 2, and the durability of the present connecting link is greater than that of the conventional connecting link shown in FIG. 2, because the region of the surface of the circular arc portion of the sector of the tip of the second arm of the present connecting link repeatedly abutting against the side surface of the guide groove close to the rotor following the fluctuation of the inclination of the cam plate is larger than the region of the surface of the ball at the tip of the pin of the conventional connecting link shown in FIG. 2.

The apex of the sector of the tip of the second arm of the present connecting link abuts against the side surface of the guide groove distant from the rotor. However, no high contact pressure is generated at the abutting point between the apex of the sector of the tip and the side surface of the guide groove distant from the rotor because the apex of the sector of the tip of the second arm is forced in the direction apart from the side surface of the guide groove distant from the rotor. Moreover, the apex of the sector of the tip of the second arm is rounded. Therefore, no excessive wear is generated on the apex of the sector of the tip of the second arm.

In accordance with another aspect of the present invention, there is provided a connecting link between a rotor supported by a driving shaft to rotate synchronously with the driving shaft and a variable inclination cam plate supported by the driving shaft of a variable displacement swash plate compressor, comprising a first arm extending from the rotor toward the cam plate and a second arm extending from the cam plate toward the rotor, wherein the first arm is provided with a guide hole extending parallel to a plane defined by the central axis of the driving shaft and the top dead center of the cam plate, the second arm is provided with a tip whose shape as viewed from the side is a sector with rounded apex, and the tip of the second arm is inserted in the guide hole with the apex of the sector abutted against the side surface of the guide hole distant from the rotor and the circular arc portion of the sector abutted against the side surface of the guide hole close to the rotor.

In the connecting link of this aspect of the present invention, the second arm is provided with a tip of sector shape in side view. Therefore, the radius of curvature of the circular arc portion of the sector of the tip inserted into the guide hole (with the circular arc portion abutted against the side surface of the guide hole close to the rotor) can be made larger than that of the ball at the tip of the pin of the conventional connecting link shown in FIG. 2.

In the connecting link of this aspect of the present invention, the radius of curvature of the circular arc portion of the sector of the tip of the second arm is larger than that of the ball at the tip of the pin of the conventional connecting link shown in FIG. 2. Therefore, the distance between the abutting point of the surface of the circular arc portion of the sector of the tip of the second arm against the side surface of the guide hole close to the rotor at the minimum inclination of the cam plate and the abutting point of the surface of the circular arc portion of the sector of the tip of the second arm against the side surface of the guide hole close to the at the maximum inclination of the cam plate is larger than the distance between the abutting points of the surface of the ball at the tip of the second arm of the conventional connecting link shown in FIG. 2. Thus, the region of the surface of the circular arc portion of the sector of the tip of the second arm abutting repeatedly against the side surface of the guide hole close to the rotor following the fluctuation of the inclination of the cam plate is larger than the repeatedly abutting region of the surface of the ball at the tip of the second arm of the conventional connecting link shown in FIG. 2.

High contact pressure is generated at the abutting point between the surface of the circular arc portion of the sector of the tip of the second arm and the side surface of the guide hole close to the rotor because a thrust force is transmitted from the cam plate to rotor during the operation of the compressor. However, the wear of the surface of the circular arc portion of the sector of the tip of the second arm of the present connecting link is less than the wear of the surface of the ball at the tip of the second arm of the conventional connecting link shown in FIG. 2, the durability of the second arm of the present connecting link is greater than that of the conventional connecting link shown in FIG. 2, and the durability of the present connecting link is greater than that of the conventional connecting link shown in FIG. 2, because the region of the surface of the circular arc portion of the sector of the tip of the second arm of the present connecting link repeatedly abutting against the side surface of the guide hole close to the rotor following the fluctuation of the inclination of the cam plate is larger than the region of the surface of the ball at the tip of the pin of the conventional connecting link shown in FIG. 2.

The apex of the sector of the tip of the second arm of the present connecting link abuts against the side surface of the guide hole distant from the rotor. However, no high contact pressure is generated at the abutting point between the apex of the sector of the tip and the side surface of the guide hole distant from the rotor because the apex of the sector of the tip of the second arm is forced in the direction apart from the side surface of the guide hole distant from the rotor. Moreover, the apex of the sector of the tip of the second arm is rounded. Therefore, no excessive wear is generated on the apex of the sector of the tip of the second arm.

BRIEF DESCRIPTION OF THE DRAWINGS

In the drawings:

FIG. 2 is a sectional view of a conventional connecting link between the rotor and the cam plate of a variable displacement swash plate compressor, wherein (a) shows the connecting link at the minimum inclination of the cam plate, (b) shows the connecting link at the maximum inclination of the cam plate, and (c) shows a fragmentary enlarged overlapped view of (a) and (b).

FIG. 5 is a sectional view of the connecting link between the rotor and the cam plate of a variable displacement swash plate compressor in accordance with a second embodiment of the present invention, wherein (a) shows the connecting link at the minimum inclination of the cam plate, (b) shows the connecting link at the maximum inclination of the cam plate, and (c) shows a fragmentary enlarged overlapped view of (a) and (b).

FIG. 6 is a front view of the rotor and the cam plate of the second embodiment of the present invention, wherein (a) is a view in the direction of arrows a—a in FIG. 5(a), and 6(b) is a view in the direction of arrows b—b in FIG. 5(a).

FIG. 7 is a sectional view of a variation of the connecting link between the rotor and the cam plate of a variable displacement swash plate compressor in accordance with the second embodiment of the present invention, wherein (a) shows the connecting link at the minimum inclination of the cam plate, and (b) shows the connecting link at the maximum inclination of the cam plate.

DETAILED DESCRIPTION OF THE PREFERRED EMBODIMENT

Figure 3B:
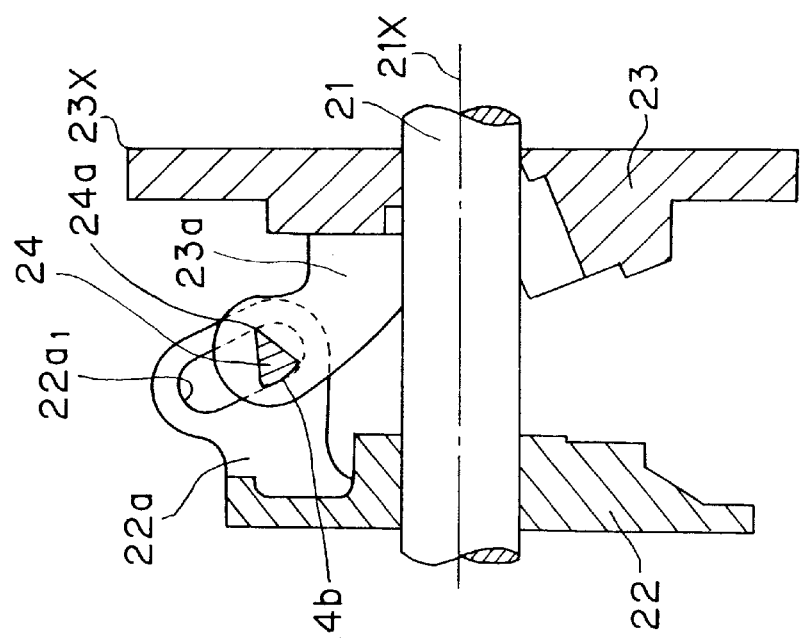
FIG. 3 is a sectional view of the connecting link between the rotor and the cam plate of a variable displacement swash plate compressor in accordance with a first embodiment of the present invention, wherein (a) shows the connecting link at the minimum inclination of the cam plate, (b) shows the connecting link at the maximum inclination of the cam plate, and (c) shows a fragmentary enlarged overlapped view of (a) and (b).
Figure 3A:
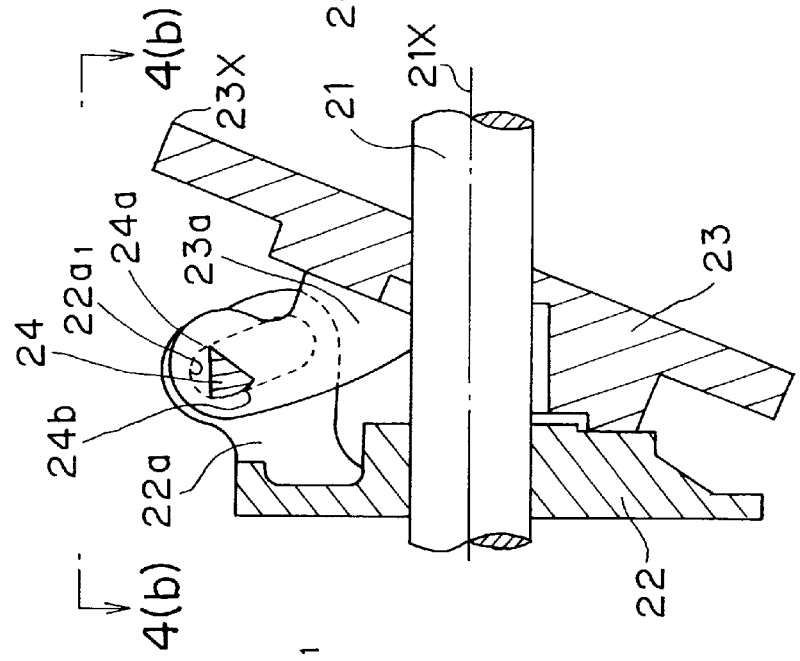
Figure 3C:
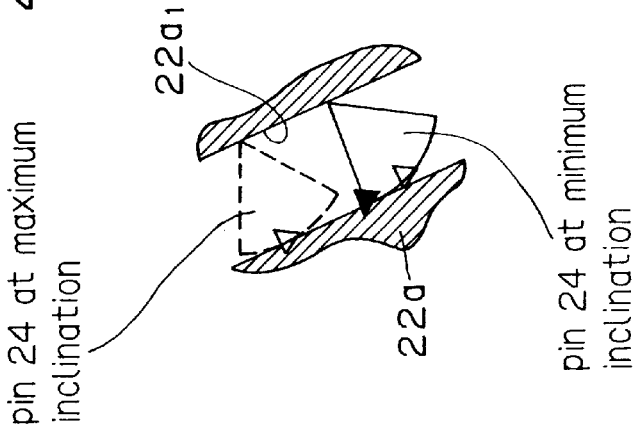

A first preferred embodiment of the present invention will be described based on FIGS. 3 and 4(a).

A rotor 22 is supported by a driving shaft 21 of a variable displacement swash plate compressor to rotate synchronously with the driving shaft 21. A variable inclination cam plate 23 is supported by the driving shaft 21. The cam plate 23 can incline between the minimum inclination as shown in FIG. 3(a) and the maximum inclination as shown in FIG. 3(b).

A pair of arms 22a extend from the rotor 22 toward the cam plate 23. One of the arms 22a extends at one side of a plane defined by the central axis 21X of the driving shaft 21 and the top dead center 23X of the cam plate 23. The other of the arms 22a extends at the other side of the plane. Each arm 22a is provided with an inclined oval guide hole $22a_7$ extending at right angles to the plane.

A pair of arms 23a extend from the cam plate 23 toward the rotor 22. One of the arms 23a extends at one side of the plane defined by the central axis 21X of the driving shaft 21 and the top dead center 23X of the cam plate 23. The other of the-arms 23a extends at the other side of the plane. A pin 24 having a sector-shaped cross section extends across and is fixed to the arms 23a. The pin 24 extends at right angles to the plane. The apex 24a of the sector-shaped cross section is rounded.

The pin 24 is inserted in the oval guide holes $22a_7$. The rounded apex 24a of the sector-shaped cross section of the pin 24 is abutted against the long side surfaces of the oval holes $22a_7$ distant from the rotor 22. The circular arc portion 24b of the sector-shaped cross section of the pin 24 is abutted against the long side surfaces of the oval holes $22a_7$ close to the rotor 22.

In the connecting link of the present embodiment, the cross section of the pin 24 inserted into the oval guide holes $22a_7$ of the rotor 22 is sector-shaped. Therefore, the radius of curvature of the circular arc portion 24b of the sector-shaped cross section of the pin 24 inserted into the oval guide holes $22a_7$ (with the circular arc portion 24b abutted against the long side surfaces of the oval guide holes $22a_7$ close to the rotor 22) can be made larger than that of the circular cross section of the pin 4 of the conventional connecting link shown in FIG. 1.

Figure 1A:
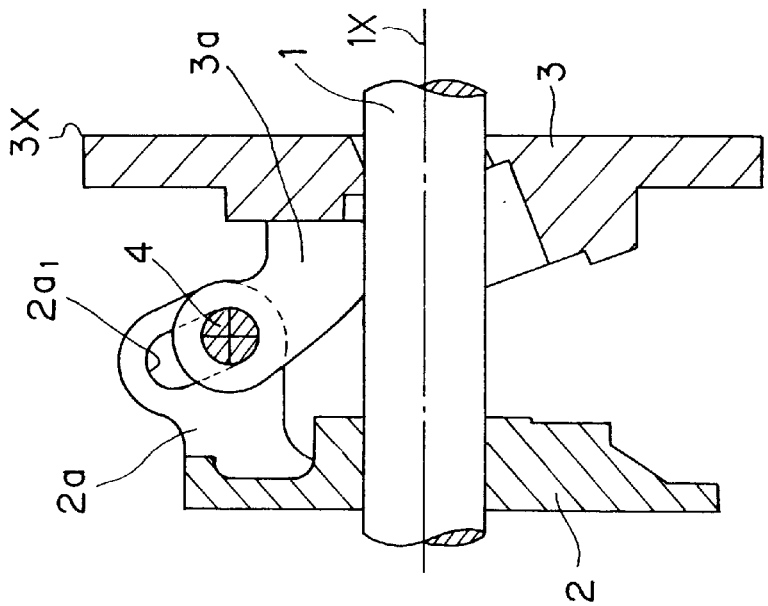
FIG. 1 is a sectional view of a conventional connecting link between the rotor and the cam plate of a variable displacement swash plate compressor, wherein (a) shows the connecting link at the minimum inclination of the cam plate, (b) shows the connecting link at the maximum inclination of the cam plate, and (c) shows a fragmentary enlarged overlapped view of (a) and (b).
Figure 1B:
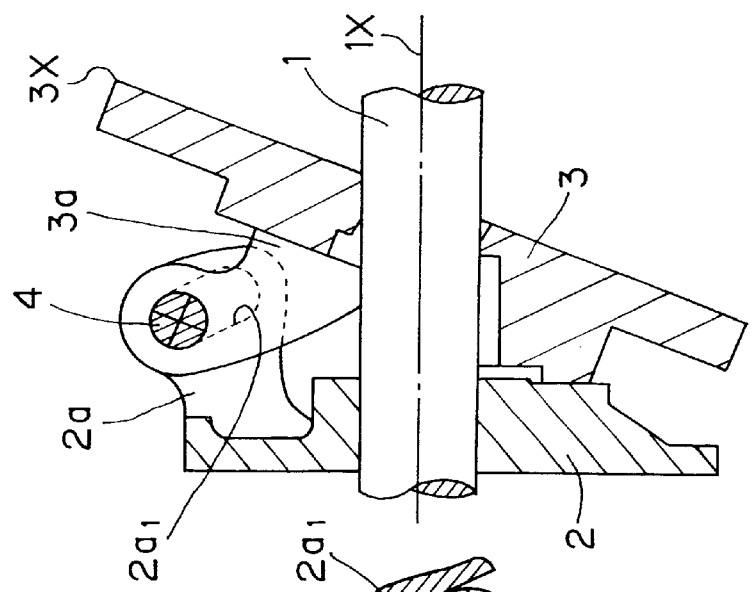
Figure 1C:

In the connecting link of the present embodiment, the radius of curvature of the circular arc portion 24b of the sector-shaped cross section of the pin 24 is larger than that of the circular cross section of the pin 4 of the conventional connecting link shown in FIG. 1. Therefore, the distance between the abutting point of the surface of the pin 24 against the long side surface of the oval guide hole $22a_7$ close to the rotor 22 at the minimum inclination of the cam plate 23 (indicated by a solid triangle in FIG. 3(c)) and the abutting point of the surface of the pin 24 against the long side surface of the oval guide hole $22a_7$ close to the rotor 22 at the maximum inclination of the cam plate 23 (indicated by an open triangle in FIG. 3(c)) is larger than that of the pin 4 of the conventional connecting link shown in FIG. 1(c). Thus, the region of the surface of the pin 24 abutting repeatedly against the long side surface of the oval guide hole $22a_7$ close to the rotor 22 following the fluctuation of the inclination of the cam plate 23 is larger than that of the pin 4 of the conventional connecting link shown in FIG. 1.

High contact pressure is generated at the abutting point between the surface of the pin 24 and the long side surface of the oval guide hole $22a_7$ close to the rotor 22 because a thrust force is transmitted from the cam plate 23 to rotor 22 during the operation of the compressor. However, the wear of the surface of the pin 24 of the present connecting link is less than that of the pin 4 of the conventional connecting link shown in FIG. 1, the durability of the pin 24 of the present connecting link is greater than that of the pin 4 of the conventional connecting link shown in FIG. 1, and the durability of the present connecting link is greater than that of the conventional connecting link shown in FIG. 1, because the region of the surface of the pin 24 of the present connecting link abutting repeatedly against the long side surface of the oval guide hole $22a_7$ close to the rotor 22 following the fluctuation of the inclination of the cam plate 23 is larger than that of the pin 4 of the conventional connecting link.

The apex 24a of the sector-shaped cross section of the pin 24 of the present connecting link abuts against the long side surface of the oval guide hole $22a_7$ distant from the rotor 22. However, no high contact pressure is generated at the abutting point between the apex 24a of the sector-shaped cross section of the pin 24 and the long side surface of the oval guide hole $22a_7$ distant from the rotor 22 because the apex 24a of the sector-shaped cross section of the pin 24 is forced in the direction apart from the long side surface of the oval guide hole distant from the rotor 22. Moreover, the apex 24a of the sector-shaped cross section of the pin 24 is rounded. Therefore, no excessive wear is generated on the apex 24a of the sector-shaped cross section of the pin 24.

A second preferred embodiment of the present invention will be described based on FIGS. 5 and 6.

A rotor 32 is supported by a driving shaft 31 of a variable displacement swash plate compressor to rotate synchronously with the driving shaft 31. A variable inclination cam plate 33 is supported by the driving shaft 31. The cam plate 33 can incline between the minimum inclination as shown in FIG. 5(a) and the maximum inclination as shown in FIG. 5(b).

A pair of arms 32a extend from the rotor 32 toward the cam plate 33. One of the arms 32a extends at one side of a plane defined by the central axis 31X of the driving shaft 31 and the top dead center 33X of the cam plate 33. The other of the arms 32a extends at the other side of the plane. Each arm 32a is provided with a guide groove $32a_7$ extending parallel to the plane. The pair of guide grooves $32a_7$ face each other.

An arm 33a extends from the cam plate 33 toward the rotor 32. One side portion of the arm 33a extends at one side of the plane defined by the central axis 31X of the driving shaft 31 and the top dead center 33X of the cam plate 33. The other side portion of the arm 33a extends at the other side of the plane. The arm 33a is rivetted to a boss 33' formed integrally with the cam plate 33. Both side portions 33b of the tip of the arm 33a are sector-shaped as viewed from the side. The apexes 33c of the sectors are rounded.

One of the side portions 33b of the tip of the arm 33a is inserted in one of the guide grooves $32a_7$. The rounded apex 33c of the sector is abutted against the side surface of the guide groove $32a_7$ distant from the rotor 32. The circular arc portion 33d of the sector is abutted against the side surface of the guide groove $32a_7$ close to the rotor 32. The other of the side portions 33b of the tip of the arm 33a is inserted in the other of the guide grooves $32a_7$ in the same way.

In the connecting link of the present embodiment, the side portions 33b of the tip of the arm 33a inserted into the guide grooves $32a_7$ of the rotor 32 are sector-shaped as viewed from the side. Therefore, the radius of curvature of the circular arc portions 33d of the sectors (abutted against the side surfaces of the guide grooves $32a_7$ close to the rotor 32) of the side portions 33b of the tip of the arm 33 inserted in the oval guide holes $32a_7$ can be made larger than that of the ball 14a at the tip of the pin 14 of the conventional connecting link shown in FIG. 2.

In the connecting link of the present embodiment, the radius of curvature of the circular arc portion 33d of the sector of each side portion 33b of the tip of the arm 33a is larger than that of the ball 14a at the tip of the pin 14 of the conventional connecting link shown in FIG. 2. Therefore, the distance between the abutting point of the surface of the circular arc portion 33d against the side surface of the guide groove 32$a_7$ close to the rotor 32 at the minimum inclination of the cam plate 33 (indicated by a solid triangle in FIG. 5(c)) and the abutting point of the surface of the circular arc portion 33d against the side surface of the guide groove 32$a_7$ close to the rotor 32 at the maximum inclination of the cam plate 33 (indicated by an open triangle in FIG. 5(c)) is larger than the distance between the abutting points of the surface of the ball 14a of the conventional connecting link shown in FIG. 2(c). Thus, the region of the surface of the circular arc portion 33d of each side portion 33b of the tip of the arm 33a abutting repeatedly against the side surface of the guide groove 32$a_7$ close to the rotor 32 following the fluctuation of the inclination of the cam plate 33 is larger than the region of the surface of the ball 14a abutting repeatedly against the side surface of the guide hole 12$a_7$ close to the rotor 12 following the fluctuation of the inclination of the cam plate 13 of the conventional connecting link shown in FIG. 2.

High contact pressure is generated at the abutting point between the surface of the circular arc portion 33d of each side portion 33b of the tip of the arm 33a and the side surface of the guide groove 32$a_7$ close to the rotor 32 because a thrust force is transmitted from the cam plate 33 to rotor 32 during the operation of the compressor. However, the wear of the surface of the circular arc portion 33d of each side portion 33b of the tip of the arm 33a is less than that of the ball 14a of the conventional connecting link shown in FIG. 2, the durability of the arm 33a of the present connecting link is greater than that of the pin 14 of the conventional connecting link shown in FIG. 2, and the durability of the present connecting link is greater than that of the conventional connecting link shown in FIG. 2, because the region of the surface of the circular arc portion 33d of each side portion 33b of the tip of the arm 33a of the present connecting link abutting repeatedly against the side surface of the oval guide groove 32$a_7$ close to the rotor 32 following the fluctuation of the inclination of the cam plate 33 is larger than that of the pin 14 of the conventional connecting link shown in FIG. 2.

The apex 33c of the sector of each side portion 33b of the tip of the arm 33a of the present connecting link abuts against the side surface of the guide groove 32$a_7$ distant from the rotor 32. However, no high contact pressure is generated at the abutting point between the apex 33c of each side portion 33b of the tip of the arm 33a and the side surface of the guide groove 32$a_7$ distant from the rotor 32 because the apex 33c of each side portion 33b of the tip of the arm 33a is forced in the direction apart from the side surface of the guide groove 32$a_7$ distant from the rotor 32.

Moreover, the apex 33c of each side portion 33b of the tip of the arm 33a is rounded. Therefore, no excessive wear is generated on the apex 33c of each side portion 33b of the tip of the arm 33a.

One of the side portions 33b of the tip of the arm 33a is inserted in one of the guide grooves 32$a_7$ at one side of the plane defined by the central axis 31X and the top dead center 33X of the cam plate 33, while the other of the side portions 33b of the tip of the arm 33a is inserted in the other of the guide grooves 32$a_7$ at the other side of the plane. Thus, the movement of the cam plate 33 during the operation of the compressor becomes stable.

Figure 4B:
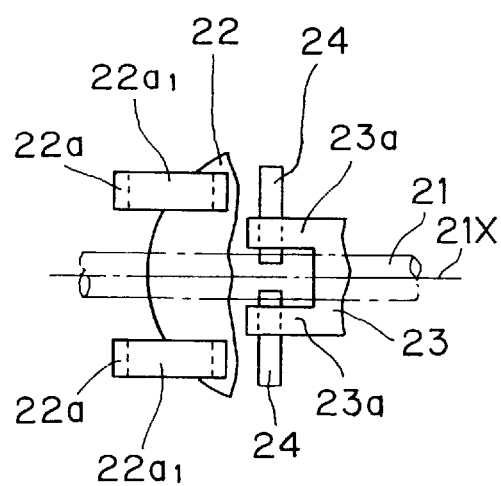
FIG. 4 is a schematic view in the direction of arrows a—a in FIG. 3(b), wherein (a) is a schematic view of the connecting link of the first embodiment of the present invention, and (b) is a schematic view of the variation of the connecting link of the first embodiment.
Figure 4A:
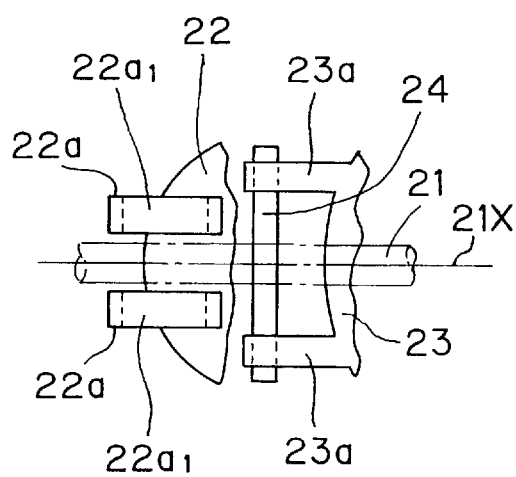

In the first embodiment, each arm 23a may be provided with a separate pin 24 as shown in FIG. 4(b). In this case, one of the pins 24 is inserted in one of the oval guide holes 22$a_7$ and the other of the pins 24 is inserted in the other of the oval guide holes 22$a_7$.

In the second embodiment, the center portion of the tip of the arm 33a may be cut out to lighten the connecting link as indicated by a tow-dot chain line in FIG. 6(b).

In the second embodiment, the pair of guide grooves 32$a_7$ may be replaced by a pair of guide holes and the pair of side portions 33b at the tip of the arm 33a may be replaced by a pair of arms having tips of the same shape as the side portions 33b. In this case, the tips of the arms are inserted in the guide holes.

Figure 8A:
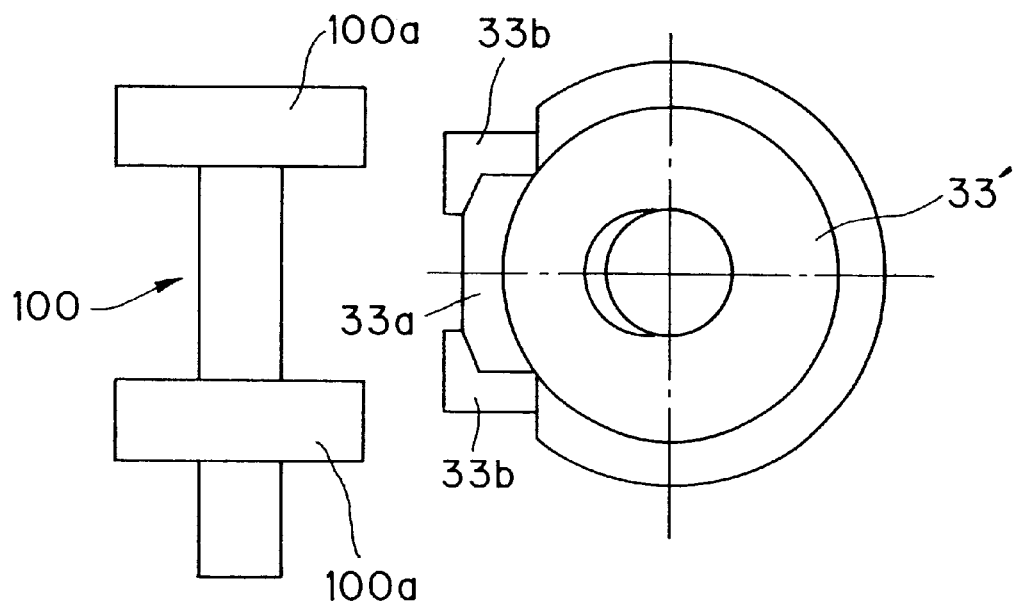
FIG. 8 is a view for explaining the machining method of the arm 33a of FIG. 7.
Figure 8B:
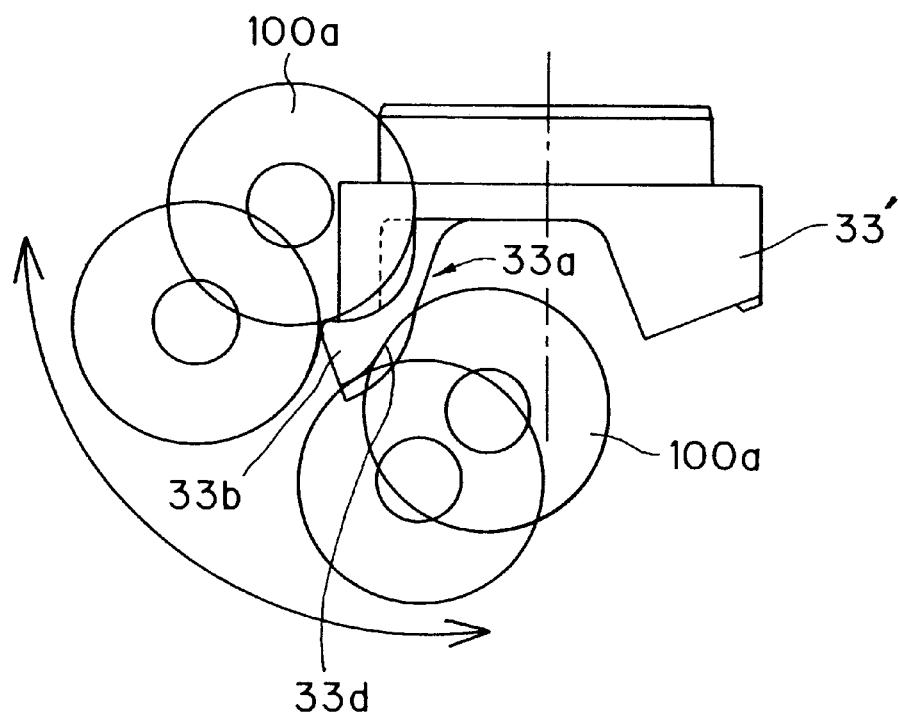

A modification of the second embodiment is shown in FIG. 7, wherein the arm 33a is formed integrally with the boss 33' and the boss 33' is pressed into the cam plate 33 to decrease the number of the elements. The circular arc portions 33d of the sectors of the side portions 33b of the tip of the arm 33a and the rounded apexes 33c can be easily formed using a side cutter 100 provide with a pair of rotary blades 100a as shown in FIG. 8.

While the present invention has been described with reference to preferred embodiments, one of ordinary skill in the art will recognize that modifications and improvements may be made while remaining within the spirit and scope of the present invention. The scope of the invention is determined solely by the appended claims.

What is claimed is:

1. A connecting link between a rotor supported by a driving shaft to rotate synchronously with the driving shaft and a variable inclination cam plate supported by the driving shaft of a variable displacement swash plate compressor, comprising a first arm extending from the rotor toward the cam plate and a second arm extending from the cam plate toward the rotor, wherein the first arm is provided with an oval guide hole extending at right angles to a plane defined by the central axis of the driving shaft and the top dead center of the cam plate, the second arm is provided with a pin extending at right angles to the plane, and the has a sector-shaped cross section with a rounded apex, and the pin is inserted in the oval guide hole with the apex of the sector-shaped cross section abutted against the long side surface of the oval guide hole distant from the rotor and a circular arc portion of the sector-shaped cross section abutted against the long side surface of the oval guide hole close to the rotor.

2. A connecting link of claim 1, wherein engagement between the oval guide hole and the pin is established at each side of the plane.

3. A connecting link of claim 2, wherein a pair of second arms extend from the cam plate toward the rotor and are provided with a single pin extending from one of the second arms to the other of the second arms.

4. A connecting link of claim 2, wherein a pair of second arms extend from the cam plate toward the rotor and each of them is provided with a single pin.

5. A connecting link between a rotor supported by a driving shaft to rotate synchronously with the driving shaft and a variable inclination cam plate supported by the driving shaft of a variable displacement swash plate compressor, comprising a first arm extending from the rotor toward the cam plate and a second arm extending from the cam plate toward the rotor, wherein the first arm is provided with a guide groove extending parallel to a plane defined by the central axis of the driving shaft and the top dead center of the cam plate, the second arm is provided with a tip whose shape as viewed from the side is a sector with rounded apex, and the tip of the second arm is inserted in the guide groove with the apex of the sector abutted against the side surface of the guide groove distant from the rotor and the circular arc portion of the sector abutted against the side surface of the guide groove close to the rotor.

6. A connecting link of claim 5, wherein engagement between the guide groove and the tip of the second arm is established at each side of the plane.

7. A connecting link between a rotor supported by a driving shaft to rotate synchronously with the driving shaft and a variable inclination cam plate supported by the driving shaft of a variable displacement swash plate compressor, comprising a first arm extending from the rotor toward the cam plate and a second arm extending from the cam plate toward the rotor, wherein the first arm is provided with a guide hole extending parallel to a plane defined by the central axis of the driving shaft and the top dead center of the cam plate, the second arm is provided with a tip whose shape as viewed from the side is a sector with rounded apex, and the tip of the second arm is inserted in the guide hole with the apex of the sector abutted against the side surface of the guide hole distant from the rotor and a circular arc portion of the sector abutted against the side surface of the guide hole close to the rotor.

8. A connecting link of claim 7, wherein engagement between the guide hole and the tip of the second arm is established at each side of the plane.

* * * * *